United States Patent [19]

Kuzuno et al.

[11] Patent Number: 4,880,943

[45] Date of Patent: Nov. 14, 1989

[54] BOUND FLAT WIRING HARNESS, BENT FLAT WIRING HARNESS, AND METHODS OF PRODUCING EACH

[75] Inventors: Katsutoshi Kuzuno; Hiroshi Watanabe; Shigeo Ishizuka, all of Shizuoka, Japan

[73] Assignee: Yazaki Corporation, Tokyo, Japan

[21] Appl. No.: 327,253

[22] Filed: Mar. 22, 1989

[30] Foreign Application Priority Data

Apr. 18, 1988 [JP] Japan .......................... 63-51001[U]
Apr. 18, 1988 [JP] Japan .......................... 63-51002[U]

[51] Int. Cl.[4] ......................... H01B 7/00; H02G 1/00

[52] U.S. Cl. ................................ 174/72 A; 29/868; 174/71 R

[58] Field of Search ............... 174/71 R, 72 R, 72 A, 174/117 R, 117 F, 117 FF, 135; 156/47, 50, 226; 29/868

[56] References Cited

U.S. PATENT DOCUMENTS 3,818,122 6/1974 Luetzow ................. 174/117 FF X

FOREIGN PATENT DOCUMENTS 51-104575 9/1976 Japan ............................ 174/71 R

*Primary Examiner*—Laramie E. Askin
*Attorney, Agent, or Firm*—Robbins & Laramie

[57] ABSTRACT

The method of binding a flat wiring harness according to the present invention comprises the steps of:

arranging a plurality of covered wires in parallel relationship in the same plane and bonding them in an easily separable manner thereby forming a flat wiring harness, separating the covered wires by a predetermined, identical number between adjacent covered wires over a predetermined length thereby dividing them into a plurality of small bundles, separating both end portions of all the covered wires in each of the small bundles between adjacent covered wires, and laying the plurality of small bundles one on top of the other and binding them up together in an easily separable manner.

Further, the method of bending a flat wiring harness according to the present invention comprises the steps of:

arranging a plurality of covered wires in parallel relationship in the same plane and bonding them in an easily separable manner thereby forming a flat wiring harness, forming a slit between adjacent covered wires in the portions of the flat wiring harness to be bent later, and bending the flat wiring harness formed with the slits so as to locate the slackening portion of each of the covered wires resulting from the difference in arc length between the inner and outer peripheries thereof at its bend outside the bend.

12 Claims, 5 Drawing Sheets

BOUND FLAT WIRING HARNESS, BENT FLAT WIRING HARNESS, AND METHODS OF PRODUCING EACH

BACKGROUND OF THE INVENTION

1. Field of the Invention

This invention relates to an art for binding a flat wiring harness formed by arranging covered electric wires in the same plane and bonding them, and also an art for bending the wire harness in the same plane.

2. Description of the prior art

As for the covered wires for use in wirings in such vehicles as motor cars, single or solid wires have so far been used since it is required to make them flexible so that they can be bent at any desired position. However, the number of electric wires required to be used has increased markedly with the increase in the kinds of electric/electronic apparatuses. In case wiring of solid or single wires is made, the flexibility of the wires makes it impossible for them to maintain rectilinearity after the completion of the wiring, thus causing a tendency for the wires themselves being mixed together and located in a disorderly manner. As a result, there has so far been a problem that the wiring operation becomes complicated so that incorrect wiring tends to occur and it is difficult to make correction of it.

To solve this problem, a flat wiring harness formed by arranging a desired number of covered wires in the same plane and bonding them by any suitable means such as adhesive bonding, etc. in an easily separable manner has come to be used of late. By binding the covered wires in such a fashion, it becomes possible to increase the rigidity of the wires thereby making it easy for them to maintain their rectilinearity after the completion of wire distribution and also preventing them from being disarranged due to the vibration of the vehicle when running. Further, if such a flat wiring harness is separated into individual single wires as occasion demands, then the individual wires can restore its original flexibility so that each of them can be bent freely and wired easily. Thus, this approach makes it easy to carry out the wiring operation, but also is effective to prevent the occurrence of incorrect wiring.

However, when mounting such a flat wiring harness on the vehicle body, it is impossible to pass the wiring harness through a small panel hole or a narrow space as it is. Therefore, it is necessary to round the flat wiring harness or divide it into several parts to pass it through such a narrow space, so that the wiring operation becomes troublesome and requires much labor.

The present invention has been made with a view to overcoming the above-mentioned disadvantages in the prior art, and has for its first object to provide a flat wiring harness which can be passed through a narrow space or a small panel hole easily.

Further, a bent configuration suitable for bending such a flat wiring harness in the same plane as that in which covered wires are arranged is proposed and disclosed in Japanese Laid-Open Patent Application No. SHO 51-104575. According to this proposal, the arrangement is made such that when the flat wiring harness is bent, the slackening portion of each of the covered wires resulting from the difference in arc length between the inner and outer peripheries thereof at its bend is located inside the bend.

However, in case the slackening portion of each of the covered wires is located inside its bend, and a unit or an equipment is located in the bend, one of the spacings between the flat wiring harness and the two sides of the unit must be larger than the other. As a result, it becomes difficult to fixedly secure the bend of the flat wiring harness to the unit, and even when it is possible, its fixing to the unit becomes unstable. In addition thereto, the distance between the outermost side of the flat wiring harness and the unit at the bend will increase thus bringing about the need for provision of a correspondingly large space outside such a unit or an equipment.

The present invention has been made in view of the abovementioned circumstances, and has for its second object to provide a flat wiring harness which enables the distance between the flat wiring harness and such a unit even at a bend of the flat wiring harness to be reduced, and also the space outside the unit to be reduced correspondingly.

SUMMARY OF THE INVENTION

To achieve the above-mentioned first object, the present invention provides a flat wiring harness, comprising both wide end portions of a plurality of covered wires bonded in the same plane in an easily separable manner, and an intermediate bound portion located between said wide end portions and consisting of small bundles each including a predetermined number of covered wires, said individual covered wires having slits formed therebetween in both end portions of said intermediate bound portion, said intermediate bound portion being bound together to such a degree as it can be separated easily into the small bundles.

To achieve the above-mentioned second object, the present invention provides a flat wiring harness, comprising both end portions of a plurality of covered wires bonded in the same plane in an easily separable manner, and bends of said covered wires located between said both end portions and bent in said plane, the slackening portion of each of the covered wires resulting from the difference in arc length between the inner and outer peripheries thereof at its bend being located outside the bend.

BRIEF DESCRIPTION OF THE DRAWINGS

FIG. 4 shows a completed flat wiring harness;

FIG. 10 shows the flat wiring harness which has been subjected to the above-mentioned steps;

DESCRIPTION OF THE PREFERRED EMBODIMENTS

The present invention will now be described below in detail by way of example only with reference to the accompanying drawings.

FIGS. 1 to 4 show steps for binding a flat wiring harness.

Figure 1:
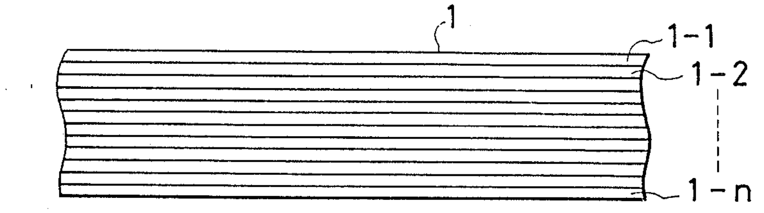
FIGS. 1 to 4 are front views showing steps of binding a flat wiring harness.

FIG. 1 shows a flat wiring harness 1. The flat wiring harness 1 is comprised of a desired number of covered wire 1—1, 1-2,-1-n, which are bonded with such a bonding strength as they can be separated easily. This bonding is made by thermal adhesion or by means of an adhesive.

Figure 2:
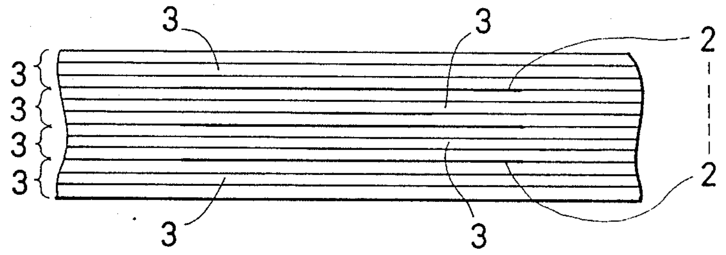

This flat wiring harness 1 is formed with slits 2, 2—, in the intermediate portion thereof, as shown in FIG. 2, thereby dividing it into a plurality of small bundles 3, 3—.

In the next place, in order to divide both end portions of the individual covered wires forming each of the small bundles 3 into single wires, each of the small bundles 3, 3—is formed with short slits 4, 4—, at both end portions thereof.

Figure 4:
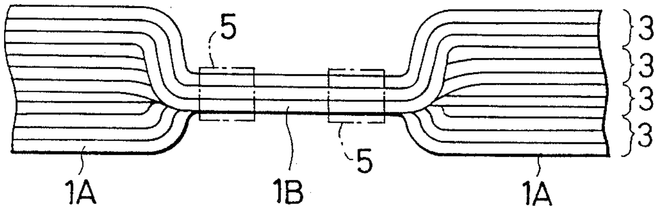

The thus divided small bundles 3, 3—are laid one on top of the other at a desired position and then bound, as shown in FIG. 4.

Figure 3:
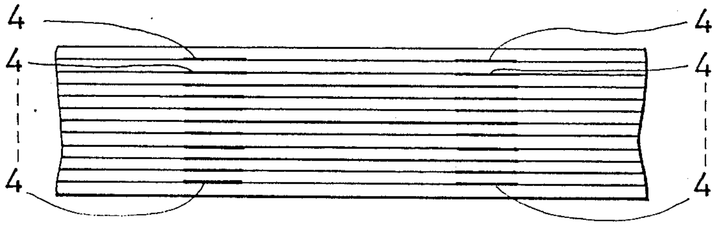

In this case, the left and right end portions of each of the covered wires 1-1, 1-2-1-n of the wiring harness 1 still remain interconnected as shown in FIG. 3. This binding is made by thermal adhesion or by means of an adhesive, in the same manner as that of bonding the covered wires 1-1, 1-2-1-n. The small bundles 3, 3—are bonded to such a degree as they can be separated easily, or alternatively it is possible to wind tape 5 around each of the main parts of the flat wiring harness.

The flat wiring harness 1 which has thus been completed consists of wide portions 1A and 1A having the original configuration on both sides thereof, and an intermediate bound portion 1B. Formation of the slits 4, 4—in both end portions of each of the small bundles 3, 3—is aimed at giving the individual wires a flexibility required for laying the small bundles 3, 3—one on top of the other at one place.

Since the flat wiring harness according to the present invention is constructed as mentioned above, in case the flat wiring harness 1 is passed through a narrow space in the vehicle body, it is only necessary to round either one of the wide portions 1A, 1A as shown in FIG. 4 and pass it through such a narrow space, and subsequently pass the bound portion 1B therethrough. Therefore, wiring operation can be made easily. Further, by selecting properly the number of covered wires forming each of the small bundles 3, 3—, and that of the small bundles when the flat wiring harness 1 is divided into several small bundles 3, 3—, as shown in FIG. 2, an intermediate bound portion having a sectional shape suitable for that of such a narrow space or a small hole through which it is required to pass can be obtained.

The flat wiring harness 1 which has passed through such a narrow space may be used as it is bound, or it may be separated into the original small bundles 3, 3—as occasion demands, and restored to the state as shown in FIG. 3, before the wire distributions.

The wiring operation after the passage of the flat wiring harness through such a narrow space or a small hole can be made in the same manner as those of the conventional flat wiring harnesses. Stating in brief, if the covered wires are separated at a position to be connected, then each of them can restore its original flexibility. Consequently, the wiring operation can be effected very easily.

Figure 5:
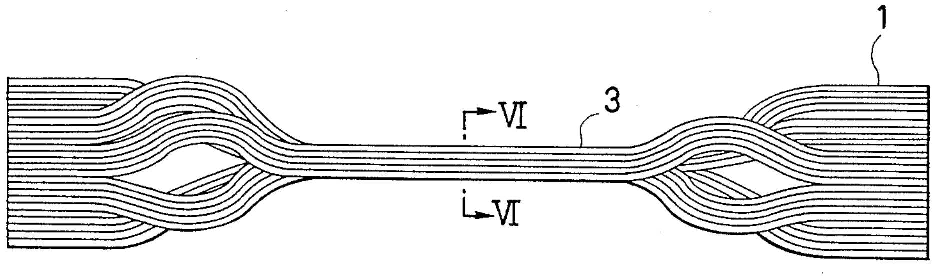
FIG. 5 is a plan view showing another embodiment of the flat wiring harness according to the present invention.
Figure 6:
FIG. 6 is a sectional view of the same taken along line VI—VI in FIG. 5.
Figure 7:
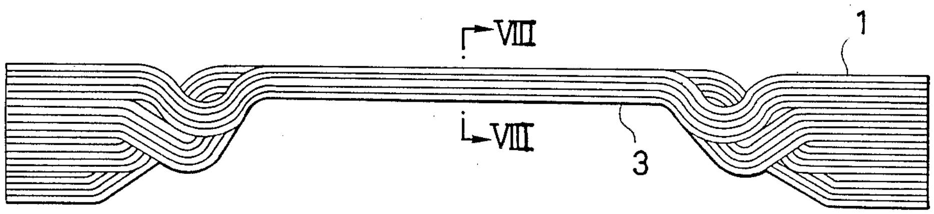
FIG. 7 is a plan view of a still further embodiment of the present invention.
Figure 8:
FIG. 8 is a sectional view of the same taken along line VIII—VIII in FIG. 7.

FIGS. 5 and 7 show other embodiments of the present invention. In the embodiment shown in FIG. 5, the arrangement is made such that the number of small bundles corresponds to the number of individual covered wires forming each of the bundles. By such an arrangement, as shown in FIG. 6, the sectional shape of the intermediate bound portion becomes square, so that the width of the bound portion can be minimized. In the embodiment shown in FIG. 7, the arrangement is made such that the number of small bundles is different from the number of the individual wires forming each of the bundles, and the flat wiring harness has a bound portion formed so as to be biased towards one side thereof. FIG. 8 shows that the bound portion is rectangular (but not square).

As described hereinabove, according to the present invention, since the flat wiring harness is arranged such that the intermediate portion thereof is divided into a plurality of small bundles, and also both end portions of each of the small bundles are separated into individual covered wires, and then the small bundles are laid one on top of the other at one place, and thereafter bound up together in an easily separable manner, it is possible to pass the flat wiring harness easily through a narrow space or a small hole.

Further, since the thus bound flat wiring harness can be returned easily to its original shape, it can be handled as a flexible electric wire during the wiring operation, and so the wiring operation can be made easily.

Figure 13:
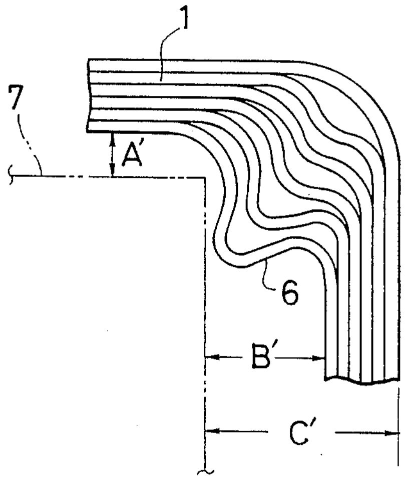
FIG. 13 PRIOR ART
FIG. 13 is a plan view of a conventional type flat wiring harness.

In case the flat wiring harness as shown in FIG. 1 is bent in the same plane as that in which the covered wires are arranged, a bent configuration which is shown in FIG. 13 and disclosed in Japanese Laid-Open Patent Application No. SHO-51-104575 has been proposed. According to this proposal, when the flat wiring harness 1 is bent, a slackening portion 6 of the innermost wire resulting from the difference in arc length between the inner and outer peripheries thereof at its bend is located inside the bend. If the slackening portion 6 of the innermost wire is thus located inside the bend, then a problem as shown in FIG. 3 will arise. Stating in brief, in case a unit or an equipment is installed at the bend, one of the spacings A′ and B′ between the two sides of the unit 7 and the flat wiring harness 1 must be larger than the other. As a result, it becomes difficult to fixedly secure the bend of the flat wiring harness to the unit 7, and even if it is possible, its fixing to the unit becomes unstable. Further, the distance C′ between the outermost side of the flat wiring harness 1 and the unit 7 will increase, thus requiring provision of a correspondingly large space outside the unit 7.

The flat wiring harness according to the present invention which can eliminate the above-mentioned disadvantages of the prior art will be described in detail hereinbelow.

Figure 9:
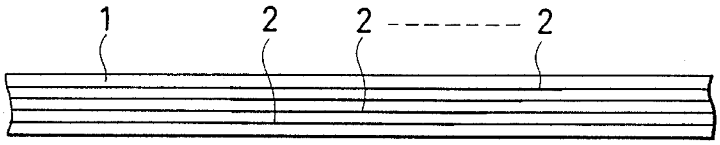
FIGS. 9 and 10 are front views showing steps for bending a flat wiring harness.
Figure 10:
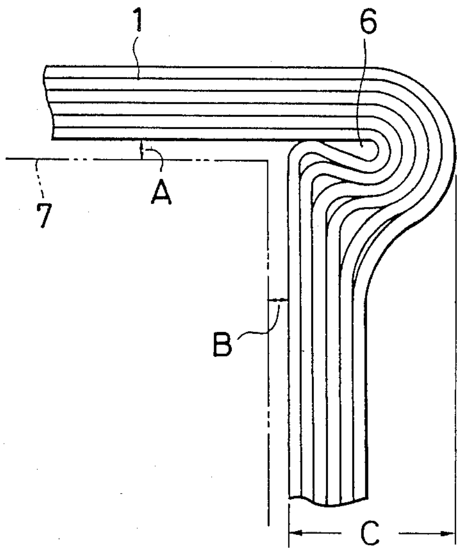

FIGS. 9 and 10 show the steps for bending the flat wiring harness according to the present invention.

In the first place, the intermediate portion of the flat wiring harness 1 to be bent subsequently is formed with slits 2, 2—, as shown in FIG. 9, so as to separate it into individual covered wires, respectively. The length of each of the slits 2 is determined properly depending on the number of the electric wires forming the flat wiring harness and the angle of the bend. Further, the length of the slit 2 formed on the outer peripheral side of the flat wiring harness is longest, whilst that of the slit 2 formed on the inner peripheral side thereof is shortest.

After the flat wiring harness 1 has been formed with the slits 2, 2—, it is bent as shown in FIG. 10. At that time, to prevent the inside of the innermost covered wire being rounded at its bend, the slackening portion 6 of the innermost wire is bent outside the bend so as to project outwardly substantially in a shape of a loop. The slackening portions of the covered wires located outside the innermost wire are arranged so as to extend along and outside the looped slackening portion 6 to thereby prevent the slackening portion of the covered wires from projecting inside the bend. Upon the completion of formation of the bend, to enable the bend to keep its shape, it is fixed by means of an adhesive or the like so that the flat wiring harness can possess a rigidity. Since the flat wiring harness 1 is thus constructed, when it is located along the unit 7 as shown in FIG. 10, the distances A and B between the flat wiring harness 1 and the two sides of the unit 7 can be reduced sufficiently. Therefore, it is also possible to secure the bend of the flat wiring harness 1 fixedly to the unit 7 along the latter.

Even after the completion of the wiring operation, the bend of the flat wiring harness can maintain its rigidity so that it can keep its shape without being bent by the vibration of the vehicle, etc.

Figure 11:
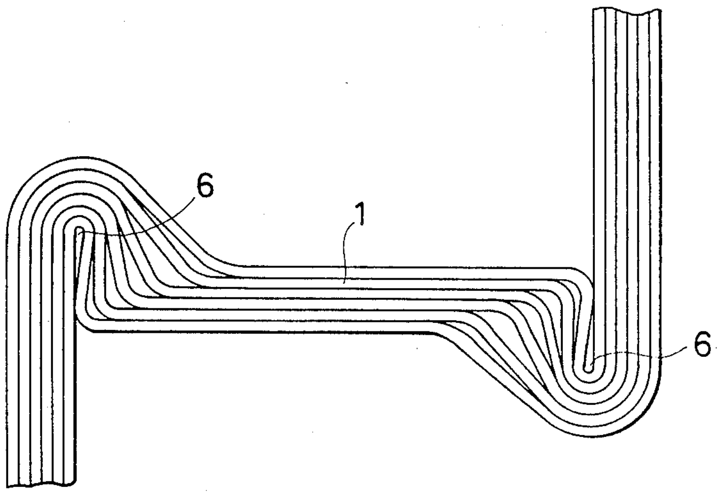
FIG. 11 is a plan view of another embodiment of the flat wiring harness according to the present invention.
Figure 12:
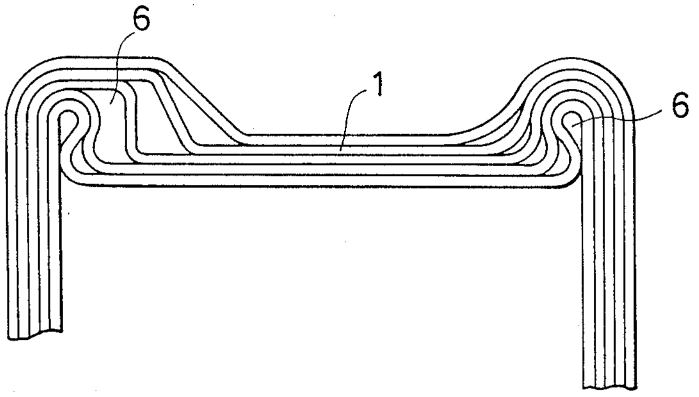
FIG. 12 is a plan view of yet further embodiment of the present invention.

FIGS. 11 and 12 show further embodiments of bent flat wiring harness. FIG. 11 shows an embodiment which has been bent in a shape of a crank, whilst FIG. 12 shows another embodiment having another bend configuration.

As described hereinabove, according to the present invention, since at a bend of a flat wiring harness formed by bending it along the plane thereof, the slackening portion of each of the covered wires resulting from the difference in arc length between the inner and outer peripheries thereof is located outside the bend, even if a unit or an equipment is installed inside the bend, the wiring harness can be bent without any interference by such a unit or equipment. Furthermore, since the inside of the bend of the flat wiring harness is not rounded, the bend can be fitted tightly to such a unit or an equipment thereby making it easy to grip the bend of the flat wiring harness. Further, the space outside such a unit or an equipment can be reduced.

It is to be understood that the foregoing description is merely illustrative of preferred embodiments of the invention, and that the scope of the invention is not to be limited thereto, but is to be determined by the scope of the appended claims.

What is claimed is:

1. A method of binding a flat wiring harness, comprising the steps of:

(a) arranging a plurality of covered wires in parallel relationship in the same plane and bonding them in an easily separable manner thereby forming a flat wiring harness;
(b) separating said covered wires by a predetermined, identical number between adjacent covered wires over a predetermined length thereby dividing them into a plurality of small bundles;
(c) separating both end portions of all of the covered wires in each of said small bundles between the adjacent covered wires; and
(d) laying said plurality of small bundles one on top of the other and binding them up together in an easily separable manner.

2. A method of binding a flat wiring harness as claimed in claim 1, wherein the step (a) of bonding said plurality of covered wires is made by the thermal adhesion process.

3. A method of binding a flat wiring harness, as claimed in claim 1, wherein the step (a) of bonding said plurality of covered wires is made by means of an adhesive.

4. A method of binding a flat wiring harness as claimed in claim 1, wherein the step (d) of binding up said plurality of small bundles together is made by the thermal adhesion process.

5. A method of binding a flat wiring harness as claimed in claim 1, wherein the step (d) of binding up said plurality of small bundles together is made by means of an adhesive.

6. A method of binding a flat wiring harness as claimed in claim 1, wherein the step (d) of binding up said plurality of small bundles together is made by using tape.

7. A method of binding a flat wiring harness as claimed in claim 1, wherein in the step (b) of dividing the covered wires into said plurality of small bundles, the number of the small bundles is identical to the number of the covered wires forming each of the small bundles.

8. A method of binding a flat wiring harness as claimed in claim 1, wherein in the step (b) of dividing the covered wires into said plurality of small bundles, the number of the small bundles is different from the number of the covered wires forming each of the small bundles.

9. A flat wiring harness, comprising both wide end portions of a plurality of covered wires bonded in the same plane in an easily separable manner, and an intermediate bound portion located between said wide end portions and consisting of small bundles each including a predetermined number of covered wires, said individual covered wires having slits formed therebetween in both end portion of said intermediate bound portion, said intermediate bound portion being bound up together in such a manner that it can be separated easily into the small bundles.

10. A method of bending a flat wiring harness comprising the steps of:

(a) arranging a plurality of covered wires in parallel relationship in the same plane and bonding them in an easily separable manner thereby forming a flat wiring harness;
(b) forming a slit between adjacent covered wires in the portions of said flat wiring harness to be bent later; and
(c) bending the flat wiring harness formed with said slits so as to locate the slackening portion of each of the covered wires resulting from the difference in arc length between the inner and outer peripheries thereof at its bend outside the bend.

11. A method of bending a flat wiring harness as claimed in claim 10, wherein in the step (b) of forming a slit between adjacent covered wires in the portions of said flat wiring harness to be bent later, the length of said slit is the longest in the covered wire located on the outer peripheral side and becomes gradually shorter towards the innter peripheral side.

12. A flat wiring harness, comprising both end portions of a plurality of covered wires bonded in the same plane in an easily separable manner, and bends of said covered wires located between said both end portions and bent in said plane, the slackening portion of each of the covered wires resulting from the difference in arc length between the inner and outer peripheries thereof at its bend being located outside the bend.

* * * * *